United States Patent
Xu

(10) Patent No.: US 11,153,796 B2
(45) Date of Patent: Oct. 19, 2021

(54) CENTRAL UNIT HANDOVER METHOD AND SERVICE PROCESSING APPARATUS

(71) Applicant: HUAWEI TECHNOLOGIES CO., LTD., Guangdong (CN)

(72) Inventor: Bin Xu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/887,101

(22) Filed: May 29, 2020

(65) Prior Publication Data

US 2020/0296642 A1    Sep. 17, 2020

Related U.S. Application Data

(63) Continuation of application No. PCT/CN2018/114775, filed on Nov. 9, 2018.

(30) Foreign Application Priority Data

Dec. 7, 2017  (CN) .......................... 201711285461.8

(51) Int. Cl.
*H04W 36/04* (2009.01)
*H04W 36/00* (2009.01)
(Continued)

(52) U.S. Cl.
CPC ....... *H04W 36/04* (2013.01); *H04W 36/0027* (2013.01); *H04W 36/0072* (2013.01); *H04W 36/06* (2013.01); *H04W 36/18* (2013.01)

(58) Field of Classification Search
CPC ............. H04W 36/04; H04W 36/0027; H04W 36/0072; H04W 36/06; H04W 36/18;
(Continued)

(56) References Cited

U.S. PATENT DOCUMENTS

2018/0368109 A1\* 12/2018 Kim .................. H04W 72/0433
2019/0082367 A1    3/2019 Lin et al.
(Continued)

FOREIGN PATENT DOCUMENTS

CN        107027153 A     8/2017
CN        106162730 B    11/2019
(Continued)

OTHER PUBLICATIONS

3GPP TSG-RAN WG2 #96, Tdoc R2-168016: "Inter-Virtual Cell Handover in Two-Layer NR Networks", ASTRI, TCL Communication Ltd. Reno, US, Nov. 14-18, 2016. (4 pages).
(Continued)

*Primary Examiner* — Robert C Scheibel
(74) *Attorney, Agent, or Firm* — Westerman, Hattori, Daniels & Adrian, LLP

(57) ABSTRACT

A central unit handover method includes: receiving, by a first distributed unit DU, a first bearer setup request that is about a first service and that is sent by a target central unit CU, where the first bearer setup request includes a first service identifier; determining, by the first DU based on the first service identifier, whether a service resource needs to be allocated to the first service; and sending, by the first DU, a first bearer setup response to the target CU, where the first bearer setup response includes information used to indicate whether the service resource needs to be allocated to the first service.

17 Claims, 6 Drawing Sheets

(51) Int. Cl.
*H04W 36/06* (2009.01)
*H04W 36/18* (2009.01)

(58) Field of Classification Search
CPC . H04W 36/0083; H04W 36/08; H04W 72/04; H04W 76/22
See application file for complete search history.

(56) References Cited

U.S. PATENT DOCUMENTS

2020/0229049 A1* 7/2020 Wu .................. H04W 88/085
2020/0383164 A1* 12/2020 Kim .................. H04W 76/19

FOREIGN PATENT DOCUMENTS

| WO | 2015143888 A1 | 10/2015 |
| WO | 2017193974 A1 | 11/2017 |

OTHER PUBLICATIONS

3GPP TSG-RAN WG3 Meeting #91 bis, R3-160799: "Initial mobility consideration for the NextGen", ZTE, Bangalore, India, Apr. 11-15, 2016. (6 pages).

3GPP TSG-RAN WG2 #95bis, Tdoc R2-166803: "Inter-Virtual Cell Handover in Two-Layer NR Networks", ASTRI, TCL Kaohsiung, Taiwan, Oct. 10-14, 2016. (4 pages).

3GPP TSG-RAN WG3 #96, R3-171682: "Whether a gNB-DU can be connected with multiple gNB-CUs", NEC, Hangzhou, P. R. China, May 15-19, 2017. (2 pages).

International Search Report dated Jan. 30, 2019, issued in counterpart Application No. PCT/CN2018/114775, with English translation. (11 pages).

Office Action dated Feb. 6, 2020, issued in counterpart CN Application No. 201711285461.8, with English Translation. (11 pages).

Ericsson, "Xn handover in a disaggregated gNB," 3GPP TSG-RAN WG3 #97, Berlin, Germany, Aug. 21-25, 2017, R3-173232. (5 pages).

Samsung, KT, SK Telecom, "Relationship among gNB-CU, gNB-DU and cell," 3GPP TSG-RAN WG3 Meeting #96, Hangzhou, P. R. China, May 15-19, 2017, R3-171631. (3 pages).

Huawei, "Discussions on mobility procedures over F1," 3GPP TSG-RAN3 Meeting # 97bis, Prague, Czech, Oct. 9-13, 2017, R3-173728. (6 pages).

Extended (Supplementary) European Search Report dated Oct. 30, 2020, issued in counterpart EP Application No. 18886295.7. (17 pages).

* cited by examiner

CENTRAL UNIT HANDOVER METHOD AND SERVICE PROCESSING APPARATUS

CROSS-REFERENCE TO RELATED APPLICATIONS

This application is a continuation of International Application No. PCT/CN2018/114775, filed on Nov. 9, 2018, which claims priority to Chinese Patent Application No. 201711285461.8, filed on Dec. 7, 2017. The disclosures of the aforementioned applications are hereby incorporated by reference in their entireties.

TECHNICAL FIELD

This application relates to the communications field, and in particular, to a central unit handover method and a service processing apparatus.

BACKGROUND

A network structure of a new-generation access network includes a central unit (CU) and a distributed unit (DU). The CU processes a radio resource control (RRC) processing protocol, a service data adaptation protocol (SDAP) layer, and a packet data convergence processing protocol (PDCP) layer, and the DU processes a radio link control (RLC) processing protocol, a media access control (MAC) processing protocol, and a physical layer (PHY) protocol. The CU and the DU are connected through a standard F1 interface, and are characterized in that the CU and the DU are flexibly deployed, the CU may use universal processing hardware, and the CU and the DU are interconnected with different vendors through the F1.

Generally, in a new-generation access network architecture, a deployment manner in which a plurality of DUs are managed by being connected to a single CU is used. However, a deployment manner in which a single DU is connected to a plurality of CUs is not excluded. From a perspective of reliability, when a CU is faulty, a DU is connected to a standby CU. In the deployment manner in which the single DU is connected to the plurality of CUs, if a CU handover occurs, currently, a relatively common processing manner for allocating a service resource on a DU side (RLC, MAC, or PHY) is to reallocate the service resource on the DU side, and UE and the DU perform synchronization by using a new service resource, to complete a CU handover process.

In the foregoing CU handover process, duo to a handover between a previous radio resource and a new radio resource in the DU, data is temporarily interrupted, and user experience is affected.

SUMMARY

Embodiments of this application provide a central unit handover method and a service processing apparatus. The method and the apparatus may reduce radio resource overheads in a CU handover process.

In view of this, a first aspect of this application provides an information processing method, and the method includes:
receiving, by a first DU, a first bearer setup request that is about a first service and that is sent by a target CU, where the first bearer setup request includes a first service identifier; and determining, by the first DU based on the first service identifier, whether a service resource needs to be allocated to the first service.

If a service identifier set includes the first service identifier, and a service indicated by any service identifier in the service identifier set is a service being executed by the first DU, the first DU may determine that no service resource needs to be allocated to the first service; or if the service identifier set does not include the first service identifier, the first DU may determine that the service resource needs to be allocated to the first service, and the first DU allocates a first service resource to the first service.

Finally, the first DU sends a first bearer setup response to the target CU, to complete a communications connection between the first DU and the target CU, where the first bearer setup response includes information used to indicate whether the service resource needs to be allocated to the first service, so that in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In some embodiments, before the receiving, by a first distributed unit DU, a first bearer setup request that is about a first service and that is sent by a target central unit CU, the method further includes:
receiving, by the first DU, a second bearer setup request that is about a second service and that is sent by a source CU; then allocating a second service resource for the second service, generating a second service identifier based on the second service, and using the second service identifier as one of the service identifier set; and finally sending a second bearer setup response to the source CU, where the second bearer setup response includes the second service identifier, to determine the service identifier set, so that when receiving a bearer setup request carrying a service identifier, the first DU can determine whether the service is being performed.

In some embodiments, the first service identifier is an identifier of the service resource of the first service.

In some embodiments, the first service is a data domain service or a circuit domain service.

A second aspect of this application provides an information processing method, and the method includes:
when a target CU receives a CU handover request that is about a first service and that is sent by a source CU, because the CU handover request includes a first service identifier, and the first service identifier is used to identify the first service, sending, by the target CU, a first bearer setup request about the first service to a first DU, where the first bearer setup request, including the first service identifier, makes the first DU to determine based on the first service identifier, whether a service resource needs to be allocated to the first service, and receiving a first bearer setup response returned by the first DU, where the first bearer setup response includes information used to indicate whether the service resource needs to be allocated to the first service; and finally sending, by the target CU, a CU handover response to the source CU, where the CU handover response includes the information used to indicate whether the service resource needs to be allocated to the first service. Therefore, in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In some embodiments, the target CU and the source CU communicate with each other by using a next generation core network (NGC).

In some embodiments, the first service identifier is an identifier of the service resource of the first service.

In some embodiments, the first service is a data domain service or a circuit domain service.

A third aspect of this application provides an information processing method, and the method includes:

sending, by a source CU, a CU handover request about a first service to a target CU, where the CU handover request includes a first service identifier, and the first service identifier is used to identify the first service, so that the target CU sends a first bearer setup request about the first service to a first DU, and the first bearer setup request, including the first service identifier, makes the first DU to determine based on the first service identifier, whether a service resource needs to be allocated to the first service, and sending a first bearer setup response to the target CU, where the first bearer setup response includes information used to indicate whether the service resource needs to be allocated to the first service, and finally receiving a CU handover response returned by the target CU, where the CU handover response includes the information used to indicate whether the service resource needs to be allocated to the first service. Therefore, in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In some embodiments, before the sending, by a source CU, a CU handover request about a first service to a target CU, the method further includes:

sending, by the source CU, a second bearer setup request about a second service to the first DU, so that the first DU generates a second service identifier based on the second service, and uses the second service identifier as one of a service identifier set; and receiving a second bearer setup response returned by the first DU, where the second bearer setup response includes the second service identifier. Because the first DU determines the service identifier set by receiving the second bearer setup request and determining the second identifier of the second service, when receiving a bearer setup request carrying a service identifier, the first DU can determine whether the service is being performed.

In some embodiments, the source CU and the target CU communicate with each other by using a next generation core network (NGC).

In some embodiments, the first service identifier is an identifier of the service resource of the first service.

In some embodiments, the first service is a data domain service or a circuit domain service.

A fourth aspect of this application provides a service processing apparatus, including:

a receive module, configured to receive a first bearer setup request that is about a first service and that is sent by a target central unit CU, where the first bearer setup request includes a first service identifier; a determining module, configured to determine, based on the first service identifier, whether a service resource needs to be allocated to the first service; and a sending module, configured to send a first bearer setup response to the target CU, where the first bearer setup response includes information used to indicate whether the service resource needs to be allocated to the first service.

Therefore, in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In Some Embodiments:

the receive module is further configured to receive, on the first DU, a second bearer setup request that is about a second service and that is sent by a source CU; a generation module is configured to generate a second service identifier based on the second service, and use the second service identifier as one of a service identifier set; the sending module is further configured to send, on the first DU, a second bearer setup response to the source CU, where the second bearer setup response includes the second service identifier; the receive module, further configured to receive the first bearer setup request that is about the first service and that is sent by the target central unit CU, where the first bearer setup request includes the first service identifier; the determining module is configured to determine, based on the first service identifier, whether the service resource needs to be allocated to the first service; and the sending module is configured to send the first bearer setup response to the target CU, where the first bearer setup response includes the information used to indicate whether the service resource needs to be allocated to the first service, to determine the service identifier set, so that when receiving a bearer setup request carrying a service identifier, the first DU can determine whether the service is being performed.

In some embodiments, the determining module is configured to: if the service identifier set includes the first service identifier, and a service indicated by any service identifier in the service identifier set is a service being executed by the first DU, determine that no service resource needs to be allocated to the first service; or if the service identifier set does not include the first service identifier, determine that the service resource needs to be allocated to the first service.

In some embodiments, an allocation module is further configured to: allocate a first service resource to the first service, and allocate a second service resource to the second service.

Therefore, in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

A fifth aspect of this application provides a service processing apparatus, including:

a receive module, configured to receive a CU handover request that is about a first service and that is sent by a source CU, where the CU handover request includes a first service identifier, and the first service identifier is used to identify the first service; a sending module, configured to send a first bearer setup request about the first service to a first DU, where the first bearer setup request includes the first service identifier, so that the first DU determines, based on the first service identifier, whether a service resource needs to be allocated to the first service; the receive module, further configured to receive a first bearer setup response sent by the first DU, where the first bearer setup response includes information used to indicate whether the service resource needs to be allocated to the first service; and the sending module, further configured to send a CU handover response to the source CU, where the CU handover response includes the information used to indicate whether the service resource needs to be allocated to the first service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

A sixth aspect of this application provides a service processing apparatus, including:

a sending module, configured to: send a CU handover request about a first service to a target CU, where the CU handover request includes a first service identifier, and the first service identifier is used to identify the first service, so that the target CU sends a first bearer setup request about the first service to a first DU, and the first bearer setup request includes the first service identifier; and enable the first DU to determine, based on the first service identifier, whether a service resource needs to be allocated to the first service, and to send a first bearer setup response to the target CU, where the first bearer setup response includes information used to indicate whether the service resource needs to be allocated to the first service; and a receive module, configured to receive a CU handover response sent by the target CU, where the CU handover response includes the information used to indicate whether the service resource needs to be allocated to the first service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In some embodiments, the sending module is further configured to send a second bearer setup request about a second service to the first DU, so that the first DU generates a second service identifier based on the second service, and uses the second service identifier as one of the service identifier set. The receive module is further configured to receive a second bearer setup response sent by the first DU, where the second bearer setup response includes the second service identifier.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

A seventh aspect of this application provides a service processing apparatus, including:

a receive module, configured to receive a first bearer setup request that is about a first service and that is sent by a target central unit CU, where the first bearer setup request includes a first service identifier; a determining module, configured to determine, based on the first service identifier, whether a service resource needs to be allocated to the first service; and a sending module, configured to send a first bearer setup response to the target CU, where the first bearer setup response includes information used to indicate whether the service resource needs to be allocated to the first service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In some embodiments, the determining module is configured to: if a service identifier set includes the first service identifier, and a service indicated by any service identifier in the service identifier set is a service being executed by the first DU, determine that no service resource needs to be allocated to the first service; or if the service identifier set does not include the first service identifier, determine that the service resource needs to be allocated to the first service.

In some embodiments, the receive module is further configured to allocate a first service resource to the first service.

In some embodiments, the receive module is further configured to receive, on the first DU, a second bearer setup request that is about a second service and that is sent by a source CU. The service processing apparatus further includes a generation module, configured to: generate a second service identifier based on the second service, and use the second service identifier as one of the service identifier set. The sending module is further configured to send, on the first DU, a second bearer setup response to the source CU, where the second bearer setup response includes the second service identifier; and the service processing apparatus further includes an allocation module, configured to allocate a second service resource to the second service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

An eighth aspect of this application provides a service processing apparatus, including:

a receive module, configured to receive a CU handover request that is about a first service and that is sent by a source CU, where the CU handover request includes a first service identifier, and the first service identifier is used to identify the first service; a sending module, configured to send a first bearer setup request about the first service to a first DU, where the first bearer setup request includes the first service identifier, so that the first DU determines, based on the first service identifier, whether a service resource needs to be allocated to the first service; the receive module, further configured to receive a first bearer setup response sent by the first DU, where the first bearer setup response includes information used to indicate whether the service resource needs to be allocated to the first service; and the sending module, further configured to send a CU handover response to the source CU, where the CU handover response includes the information used to indicate whether the service resource needs to be allocated to the first service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

A ninth aspect of this application provides a service processing apparatus, including:

a sending module, configured to: send a CU handover request about a first service to a target CU, where the CU handover request includes a first service identifier, and the first service identifier is used to identify the first service, so that the target CU sends a first bearer setup request about the first service to a first DU, and the first bearer setup request includes the first service identifier; and enable the first DU to determine, based on the first service identifier, whether a service resource needs to be allocated to the first service, and to send a first bearer setup response to the target CU, where the first bearer setup response includes information used to indicate whether the service resource needs to be allocated to the first service; and a receive module, configured to receive a CU handover response sent by the target CU, where the CU handover response includes the information used to indicate whether the service resource needs to be allocated to the first service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

In some embodiments, the sending module is further configured to send a second bearer setup request about a second service to the first DU, so that the first DU generates a second service identifier based on the second service, and uses the second service identifier as one of the service identifier set. The receive module is further configured to receive a second bearer setup response sent by the first DU, where the second bearer setup response includes the second service identifier.

A tenth aspect of this application provides a service processing apparatus, including:

a transceiver, a memory, and a processor, where the transceiver is configured to receive a first bearer setup request that is about a first service and that is sent by a target central unit CU, and the first bearer setup request includes a first service identifier; the processor is configured to determine, based on the first service identifier, whether a service resource needs to be allocated to the first service; the transceiver is configured to send a first bearer setup response to the target CU, and the first bearer setup response includes information used to indicate whether the service resource needs to be allocated to the first service; and the memory is configured to store a program, the first bearer setup request, the first service identifier, and the information used to indicate whether the service resource needs to be allocated to the first service.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

An eleventh aspect of this application provides a service processing apparatus, including:

a transceiver, a memory, and a processor, where the transceiver is configured to receive a CU handover request that is about a first service and that is sent by a source CU, the CU handover request includes a first service identifier, and the first service identifier is used to identify the first service; the processor is configured to generate a first bearer setup request about the first service; the transceiver is further configured to send the first bearer setup request to a first DU, and the first bearer setup request includes the first service identifier, so that the first DU determines, based on the first service identifier, whether a service resource needs to be allocated to the first service; the processor is further configured to generate a first bearer setup response, and the first bearer setup response includes information used to indicate whether the service resource needs to be allocated to the first service; the transceiver receives the first bearer setup response sent by the first DU, and sends a CU handover response to the source CU, where the CU handover response includes the information used to indicate whether the service resource needs to be allocated to the first service; and the memory is configured to store a program, the CU handover request, the first service identifier, the first bearer setup request, the information used to indicate whether the service resource needs to be allocated to the first service, and the first bearer setup response.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

A twelfth aspect of this application provides a service processing apparatus, including:

a transceiver, a memory, and a processor, where the processor is configured to generate a CU handover request about a first service, the CU handover request includes a first service identifier, and the first service identifier is used to identify the first service; the transceiver is configured to: send the CU handover request to a target CU, so that the target CU sends a first bearer setup request about the first service to a first DU, and the first bearer setup request includes the first service identifier; and enable the first DU to determine, based on the first service identifier, whether a service resource needs to be allocated to the first service, and to send a first bearer setup response to the target CU, where the first bearer setup response includes information used to indicate whether the service resource needs to be allocated to the first service; and the memory is configured to store a program, the CU handover request, the first service identifier, the information used to indicate whether the service resource needs to be allocated to the first service, and a CU handover response.

In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

Another aspect of this application provides a computer-readable storage medium. The computer-readable storage medium stores an instruction, and when the instruction runs on a computer, the computer is enabled to perform the method in the foregoing aspects.

It can be learned from the foregoing technical solutions that the embodiments of this application have the following advantages.

In the embodiments of this application, the first DU receives the first bearer setup request that is about the first service and that is sent by the target CU, where the first bearer setup request carries the first service identifier, and determines, based on the first service identifier, whether the service resource needs to be allocated to the first service. If the first DU determines that no resource needs to be allocated to the first service, in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

DESCRIPTION OF EMBODIMENTS

Embodiments of this application provide a central unit handover method and a service processing apparatus. The method and the apparatus may reduce radio resource overheads in a CU handover process.

To make a person skilled in the art understand the technical solutions in the embodiments of this application better, the following clearly describes the technical solutions in the embodiments of this application with reference to the accompanying drawings in the embodiments of this application. Apparently, the described embodiments are merely some but not all of the embodiments of this application.

In the specification, claims, and accompanying drawings of this application, the terms "first," "second," "third," "fourth," and the like (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include," "contain" and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, product, or device.

Figure 1:
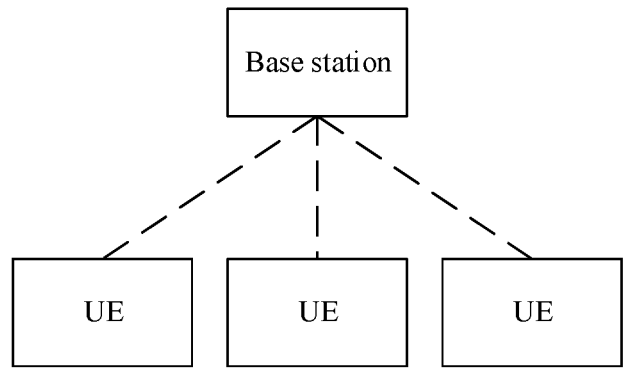
FIG. 1 is a schematic diagram of a network architecture according to an embodiment of this application.

FIG. 1 shows a network architecture according to an embodiment of this application, including a base station and a terminal.

In this embodiment of this application, the base station, namely, a public mobile communications base station, is a form of a radio station, and is a radio transceiver station that transfers information with a mobile phone terminal in a specific radio coverage area by using a mobile communication switching center. In this embodiment of this application, one base station may serve one or more cells. The cell is also referred to as a cellular cell, and is an area covered by the same base station in a cellular mobile communications system. The terminal may communicate with the base station in the area by using a radio channel. The terminal may be any terminal device including a mobile phone, a tablet computer, a personal digital assistant (PDA), a point of sales (POS), an in-vehicle computer, and the like. A structure of the terminal is described by using an example of the mobile phone. The mobile phone includes components such as a radio frequency (RF) circuit, a memory, an input unit, a display unit, a sensor, an audio circuit, a wireless fidelity (WiFi) module, a processor, and a power supply. A person skilled in the art may understand that the structure of the mobile phone imposes no limitation on the mobile phone, and the mobile phone may include more or fewer components than those shown in the figure, or combine some components, or have different component arrangements.

Figure 2:
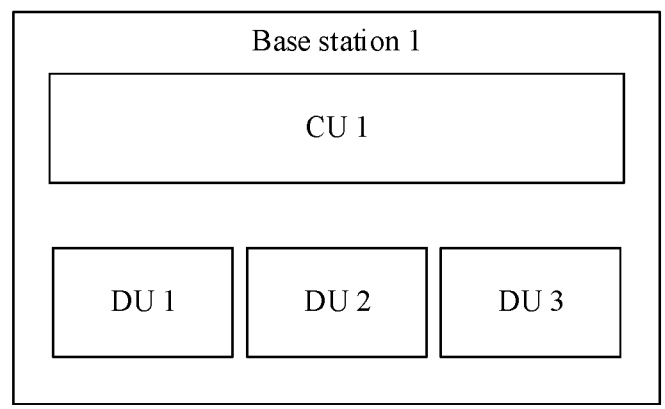
FIG. 2 is a schematic structural diagram of a network inside a base station.

In some embodiments, FIG. 2 is a schematic structural diagram of a network inside a base station. In this embodiment, the base station may have one CU and a plurality of DUs built in. For example, a base station 1 is equipped with a built-in CU 1, DU 1, DU 2, and DU 3. The DU 1, the DU 2, and the DU 3 respectively serve a plurality of different cells.

Currently, a new access network architecture may include a CU and a DU. The CU and the DU may be flexibly deployed, and have a function of being interconnected with another competitor vendor through an F1 interface. Generally, in a new access network architecture, a deployment manner in which a plurality of DUs are managed by being connected to a single CU is used. However, a deployment manner in which a single DU is connected to a plurality of CUs may alternatively be used.

Figure 3:
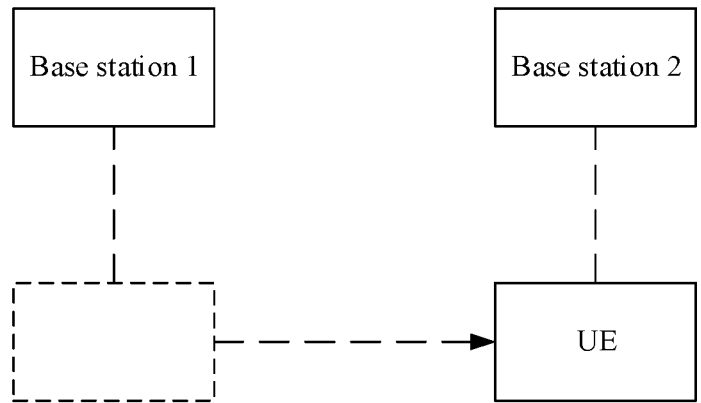
FIG. 3 is a schematic diagram illustrating that UE is handed over from a base station 1 to a base station 2.
Figure 4:
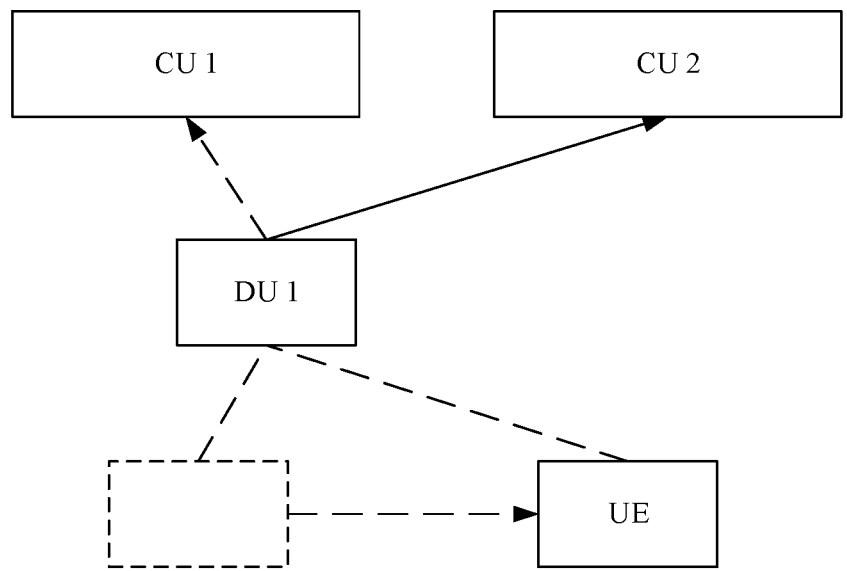
FIG. 4 is a schematic diagram illustrating that UE is handed over from a CU 1 to a CU 2.

In the latter case, as shown in FIG. 3 (which is a schematic diagram showing that UE is handed over from a base station 1 to a base station 2), when the UE is handed over from being connected to the base station 1 to being connected to the base station 2, a CU handover occurs. For example, a handover from the CU 1 of the base station 1 to a CU 2 of the base station 2 is performed. In this case, the UE originally served by the CU 1 is handed over to the CU 2. If the CU 1 and the CU 2 share the DU 1, and the UE is always served by the DU 1, when the CU handover occurs, a common manner of allocating a service resource on a DU side is to reallocate the service resource on the DU side, so that the connected UE and the DU 1 perform synchronization by using a new service resource, to complete a CU handover process (FIG. 4 is a schematic diagram showing that the UE is handed over from the CU 1 to the CU 2).

In this embodiment of this application, a first DU receives a first bearer setup request that is about a first service and that is sent by a target CU, where the first bearer setup request carries a first service identifier, and determines, based on the first service identifier, whether a service resource needs to be allocated to the first service. If the first DU determines that no resource needs to be allocated to the first service, in this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

Figure 5:
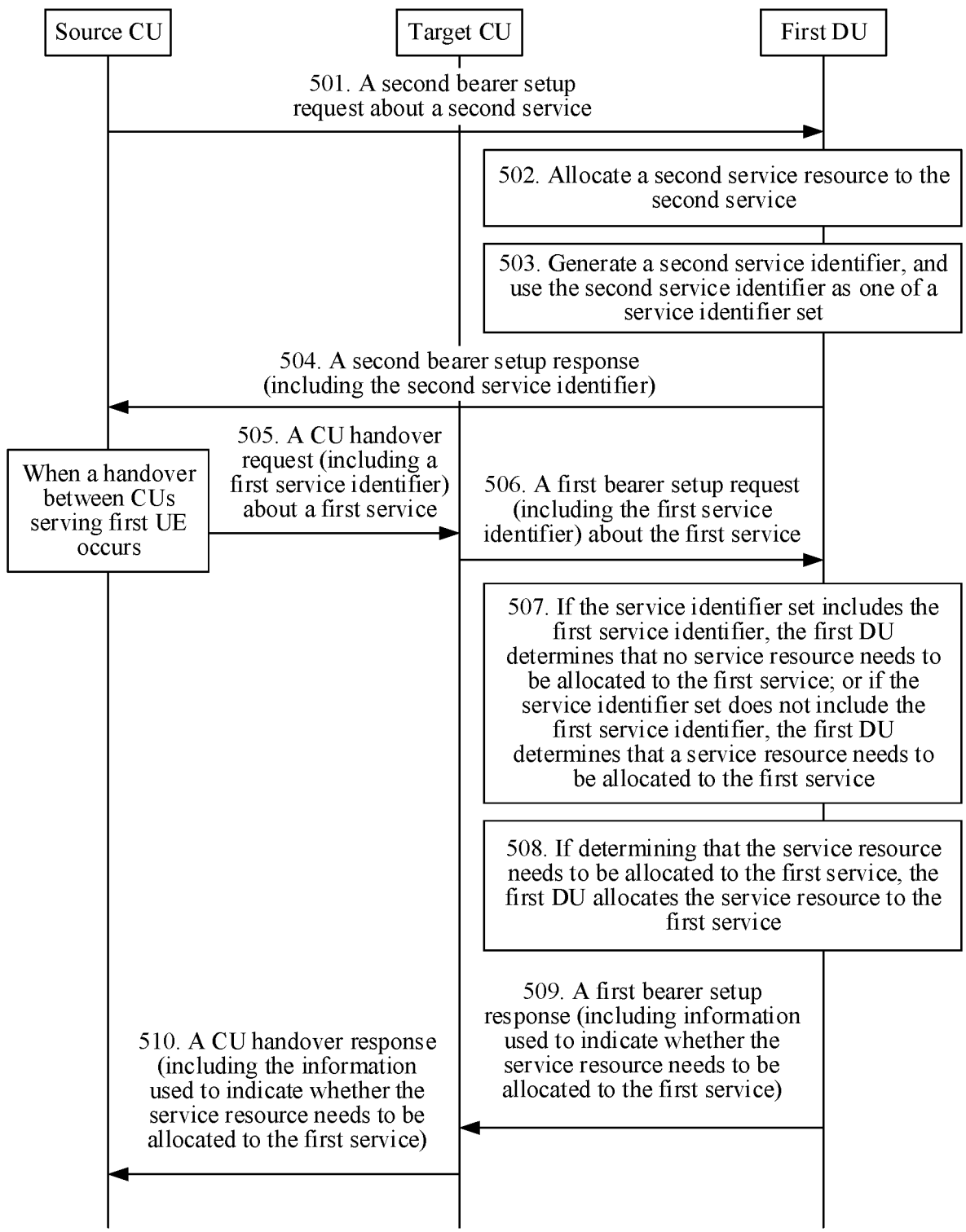
FIG. 5 is a schematic diagram of a central unit handover method according to an embodiment of this application.

For ease of understanding, the following describes a specific procedure in an embodiment of this application. FIG. 5 shows a central unit handover method according to one embodiment of this application. The method includes the following steps.

501. A source CU sends a second bearer setup request about a second service to a first DU.

In this embodiment of this application, when target UE initiates the second service in a cell (for example, a target user has a call by using the target UE), if the source CU and the first DU serve the cell, the source CU needs to serve the target UE and indicate a service resource of the second service to the DU that serves the target UE. The source CU determines the cell in which the target UE is located, determines, based on the cell, the first DU that serves the target UE, and sends the second bearer setup request about the second service to the first DU, so that the source CU establishes a communications connection to the first DU. In this embodiment of this application, the second service may be a data domain service or a circuit domain service. The data domain service is, for example, an SMS message service, and the circuit domain service is, for example, a call service. This is not limited herein.

502. The first DU allocates a second service resource to the second service.

In this embodiment of this application, the first DU provides the second service resource for the second service, that is, a protocol processing resource of the first DU, including protocol layer processing resources of RLC, MAC, and a PHY. It should be noted that, for the first DU, one service resource can be provided for only one service at one time point, and after the service ends, the service resource may be idle for use by another service. In this embodiment of this application, when receiving the second bearer setup request sent by the source CU, the first DU may allocate the second service resource to the second service if the first DU has an idle service resource. The second service resource is used to provide the target UE with the second service for use.

503. The first DU generates a second service identifier based on the second service, and uses the second service identifier as one of a service identifier set.

In this embodiment of this application, after allocating a second service resource, the first DU may determine an identifier as a second identifier for a second service, and the second identifier is used as a unique identifier of the second service. In some embodiments, the second identifier may include an identifier used to indicate information about the second service resource, a time point at which the second service starts to be performed, and the like. This is not limited herein. In this embodiment of this application, after determining the second service identifier, the first DU may use the second service identifier as a service identifier in the service identifier set. Any service identifier in the service identifier set is used to identify a service being served.

504. The first DU sends a second bearer setup response to the source CU, where the second bearer setup response includes the second service identifier.

In this embodiment of this application, after determining the second identifier, the first DU may return, to the source CU, the second bearer setup response carrying the second identifier, so that it may be determined that the source CU establishes the communications connection to the first DU. In this embodiment of this application, when receiving the second bearer setup response, the source CU may store the second identifier for use when necessary. It should be noted that the first DU and the source CU may be connected by using an F1 interface, and an information element for transmitting the second identifier is added to the F1 interface, so that the second identifier can be transmitted. This is not limited herein.

505. The source CU sends a CU handover request about a first service to a target CU, where the CU handover request includes a first service identifier, and the first service identifier is used to identify the first service.

In this embodiment of this application, because the source CU and the target CU share the first DU, different CUs and DUs serve different cells. For example, there may be the same serving cell or different serving cells between the target CU and the first DU. For example, a cell served by the target CU is a cell 1/3/5/7/9, a cell served by the source CU is a cell 2/4/6/8/10, and a cell served by the first DU is a cell 1/2/3/4/5/6/7/8. If the target UE is originally in the cell 2 served by the source CU, when the target UE moves to the cell 1 served by the target CU, a CU handover occurs. To be specific, the source CU sends the CU handover request to the target CU, so that the first DU can be handed over from the communications connection to the source CU to a communications connection to the target CU.

In this embodiment of this application, when the CU handover occurs, the source CU generates the CU handover request about the first service, the CU handover request includes a first identifier, and the source CU sends the CU handover request to the target CU. In some embodiments, the source CU and the target CU do not process the first identifier, but transparently transmit the first identifier. This is not limited herein.

It should be noted that, in this embodiment of this application, the source CU and the target CU are communicatively connected by using an Xn interface. An information element may be newly added to the Xn interface, and the newly added information element is used by the source CU and the target CU to receive and send the first identifier. It should be noted that an interface between new generation access network base stations is referred to as an Xn interface, and communication between base stations may be performed between CUs by using the Xn interface.

In some embodiments, the target CU and the source CU may communicate with each other by using a next generation core network (NGC). For example, that the source CU sends, to the target CU, the CU handover request carrying the first identifier may mean that the source CU sends the CU handover request to the NGC, and then the NGC sends the CU handover request to the target CU. In a reversed direction, when receiving information sent by the target CU to the source CU, the NGC may forward the information to the source CU. This is not limited herein.

506. The target CU sends a first bearer setup request about the first service to the first DU, where the first bearer setup request includes the first service identifier.

In this embodiment of this application, when receiving the CU handover request of the source CU, the target CU may send the first bearer setup request about the first service to the first DU, where the first bearer setup request includes the first identifier stored in the source CU. It should be noted that the target CU may determine the first DU based on the cell in which the target UE is located. For example, the target UE moves from the cell 1 to the cell 2, and when receiving the handover request of the source CU for serving the UE, the target CU may determine, based on the handover request, the cell in which the UE is located, and may determine the first DU serving the cell.

507. If the service identifier set includes the first service identifier, and a service indicated by any service identifier in the service identifier set is a service being executed by the first DU, the first DU determines that no service resource needs to be allocated to the first service. Alternatively, if the service identifier set does not include the first service identifier, the first DU determines that the service resource needs to be allocated to the first service.

508. If determining that the service resource needs to be allocated to the first service, the first DU allocates a first service resource to the first service.

In this embodiment of this application, because the first identifier is the unique identifier of the first service, when receiving the first bearer setup request, the first DU may determine whether the service identifier set includes the first identifier. If the service identifier set includes the first identifier, it indicates that the first DU is serving the first service, and the first DU does not need to additionally allocate a service resource to the first service, but may continue to use a service resource serving the first service. Therefore, only one service resource needs to be occupied, and occupying two service resources is not required, thereby reducing radio resource overheads in the CU handover process. Because the target UE is unaware of the handover process, and data is not interrupted, thereby providing good user experience. On the contrary, if the service identifier set does not include the first identifier, it indicates that the first DU is not serving the first service, and the first DU needs to additionally reallocate a service resource to the first service.

509. The first DU sends a first bearer setup response to the target CU, where the first bearer setup response includes information used to indicate whether the service resource needs to be allocated to the first service.

In this embodiment of this application, after determining, based on the first identifier, whether the service resource needs to be allocated to the first service, the first DU may return the first bearer setup response to the target CU. The first bearer setup response carries the information used to indicate whether the service resource needs to be allocated to the first service. In this way, the communications connection between the target CU and the first DU is implemented.

510. The target CU sends a CU handover response to the source CU, where the CU handover response includes the information used to indicate whether the service resource needs to be allocated to the first service.

In this embodiment of this application, after establishing the communications connection to the first DU, the target CU may send the CU handover response to the source CU, to instruct the source CU to disconnect from the first DU, so that the UE is handed over from the source CU to the target CU. In addition, the information that is carried by the CU handover response and that is about whether the service resource needs to be allocated to the first service is used to determine whether the first DU is serving the target UE by using the first service resource. If the first DU is serving the target UE by using the first service resource, no service resource needs to be additionally reallocated to the UE. In this CU handover process, only one service resource needs to be occupied, and occupying two service resources is not required, thereby reducing radio resource overheads in the CU handover process. Because a connection between the first DU and UE does not need to be interrupted in the handover process, the UE is unaware of the handover process, and data is not interrupted, thereby improving user experience.

Figure 6:
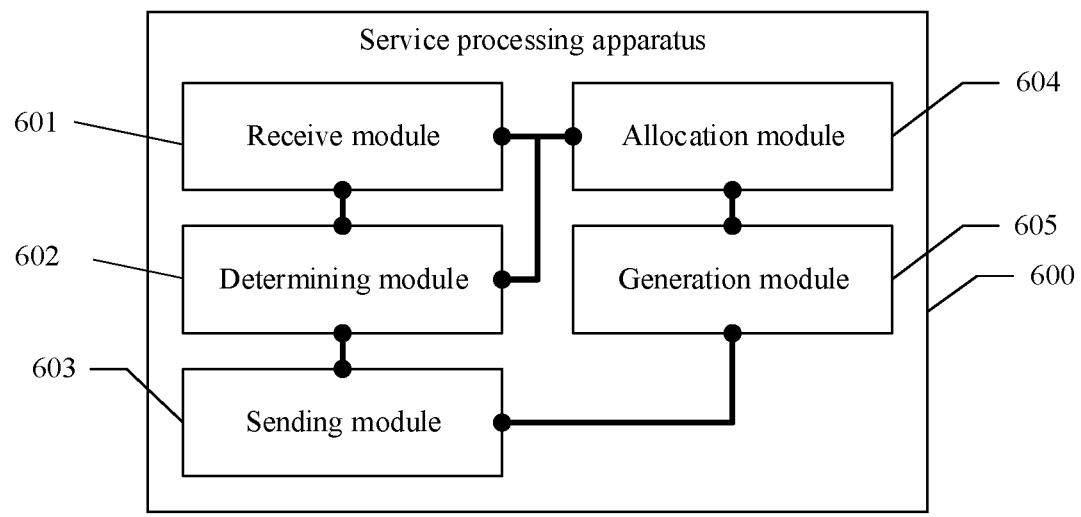
FIG. 6 is a schematic diagram of a service processing apparatus according to an embodiment of this application.

Referring to FIG. 6, according to one embodiment of this application, a service processing apparatus 600 includes:

a receive module 601, configured to receive a first bearer setup request that is about a first service and that is sent by a target central unit CU, where the first bearer setup request includes a first service identifier;

a determining module 602, configured to determine, based on the first service identifier, whether a service resource needs to be allocated to the first service; and a sending module 603, configured to send a first bearer setup response to the target CU, where the first bearer setup response includes information used to indicate whether the service resource needs to be allocated to the first service.

In some embodiments, the determining module 602 is configured to: if a service identifier set includes the first service identifier, and a service indicated by any service identifier in the service identifier set is a service being executed by a first DU, determine that no service resource needs to be allocated to the first service; or if the service identifier set does not include the first service identifier, determine that the service resource needs to be allocated to the first service.

In some embodiments, the receive module 601 is further configured to allocate a first service resource to the first service.

In some embodiments, the receive module 601 is further configured to receive, on the first DU, a second bearer setup request that is about a second service and that is sent by a source CU.

The service processing apparatus 600 further includes a generation module 605, configured to: generate a second service identifier based on the second service, and use the second service identifier as one of the service identifier set.

The sending module 603 is further configured to send, on the first DU, a second bearer setup response to the source CU, where the second bearer setup response includes the second service identifier.

The service processing apparatus further includes an allocation module 604, configured to allocate a second service resource to the second service.

Figure 7:
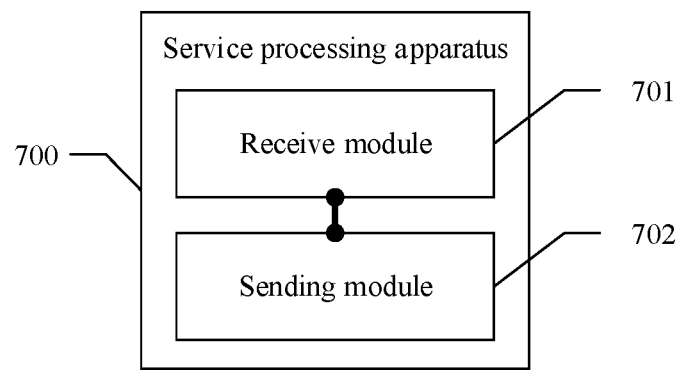
FIG. 7 is a schematic diagram of a service processing apparatus according to an embodiment of this application.

Referring to FIG. 7, according to one embodiment of this application, a service processing apparatus 700 includes:

a receive module 701, configured to receive a CU handover request that is about a first service and that is sent by a source CU, where the CU handover request includes a first service identifier, and the first service identifier is used to identify the first service;

a sending module 702, configured to send a first bearer setup request about the first service to a first DU, where the first bearer setup request includes the first service identifier, so that the first DU determines, based on the first service identifier, whether a service resource needs to be allocated to the first service;

the receive module 701, further configured to receive a first bearer setup response sent by the first DU, where the first bearer setup response includes information used to indicate whether the service resource needs to be allocated to the first service; and the sending module 702, further configured to send a CU handover response to the source CU, where the CU handover response includes the information used to indicate whether the service resource needs to be allocated to the first service.

Figure 8:
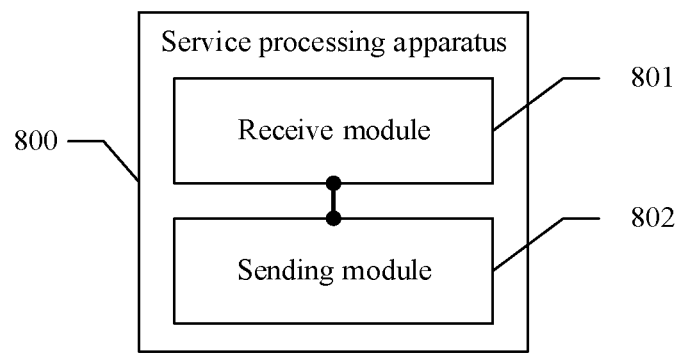
FIG. 8 is a schematic diagram of a service processing apparatus according to an embodiment of this application.

Referring to FIG. 8, according to one embodiment of this application, a service processing apparatus 800 includes:

a sending module 802, configured to: send a CU handover request about a first service to a target CU, where the CU handover request includes a first service identifier, and the first service identifier is used to identify the first service, so that the target CU sends a first bearer setup request about the first service to a first DU, and the first bearer setup request includes the first service identifier; and enable the first DU to determine, based on the first service identifier, whether a service resource needs to be allocated to the first service, and to send a first bearer setup response to the target CU, where the first bearer setup response includes information used to indicate whether the service resource needs to be allocated to the first service; and a receive module 801, configured to receive a CU handover response sent by the target CU, where the CU handover response includes the information used to indicate whether the service resource needs to be allocated to the first service.

In some embodiments, the sending module 802 is further configured to send a second bearer setup request about a second service to the first DU, so that the first DU generates a second service identifier based on the second service, and uses the second service identifier as one of the service identifier set. The receive module 801 is further configured to receive a second bearer setup response sent by the first DU, where the second bearer setup response includes the second service identifier.

Figure 9:
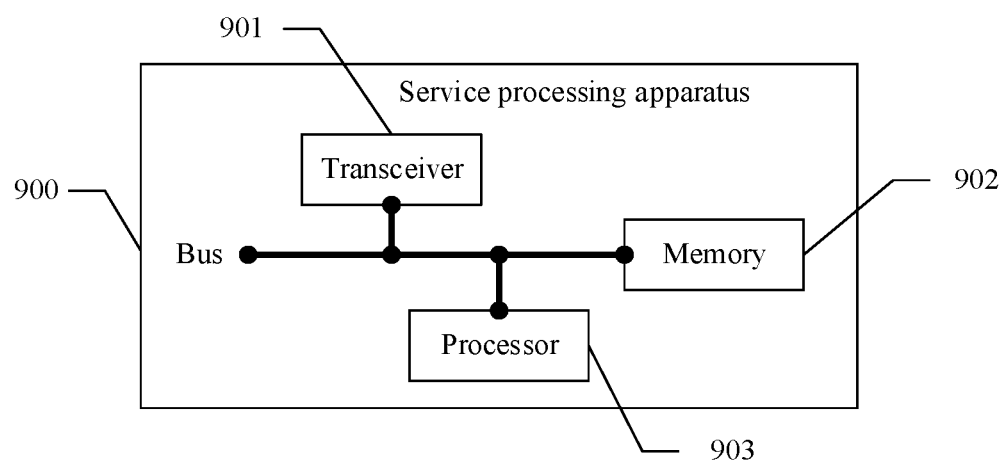
FIG. 9 is a schematic diagram of a service processing apparatus according to an embodiment of this application.

Referring to FIG. 9, according to one embodiment of this application, a service processing apparatus 900 includes:

a transceiver 901, a memory 902, and a processor 903.

The transceiver 901 is configured to receive a first bearer setup request that is about a first service and that is sent by a target central unit CU, where the first bearer setup request includes a first service identifier.

The processor 903 is configured to determine, based on the first service identifier, whether a service resource needs to be allocated to the first service.

The transceiver 901 is configured to send a first bearer setup response to the target CU, where the first bearer setup response includes information used to indicate whether the service resource needs to be allocated to the first service.

The memory 902 is configured to store a program, the first bearer setup request, the first service identifier, and the information used to indicate whether the service resource needs to be allocated to the first service.

Figure 10:
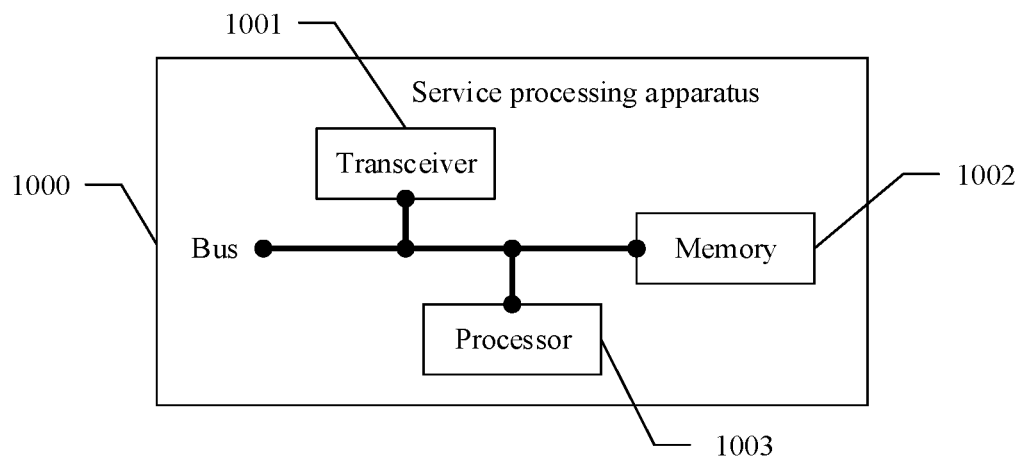
FIG. 10 is a schematic diagram of a service processing apparatus according to an embodiment of this application.

Referring to FIG. 10, according to one embodiment of this application, a service processing apparatus 1000 includes:

a transceiver 1001, a memory 1002, and a processor 1003.

The transceiver 1001 is configured to receive a CU handover request that is about a first service and that is sent by a source CU, where the CU handover request includes a first service identifier, and the first service identifier is used to identify the first service.

The processor 1003 is configured to generate a first bearer setup request about the first service.

The transceiver 1001 is further configured to send the first bearer setup request to a first DU, where the first bearer setup request includes the first service identifier, so that the first DU determines, based on the first service identifier, whether a service resource needs to be allocated to the first service.

The processor 1003 is further configured to generate a first bearer setup response, where the first bearer setup response includes information used to indicate whether the service resource needs to be allocated to the first service.

The transceiver 1001 receives the first bearer setup response sent by the first DU, and sends a CU handover response to the source CU, where the CU handover response includes the information used to indicate whether the service resource needs to be allocated to the first service.

The memory 1002 is configured to store a program, the CU handover request, the first service identifier, the first bearer setup request, the information used to indicate whether the service resource needs to be allocated to the first service, and the first bearer setup response.

Figure 11:
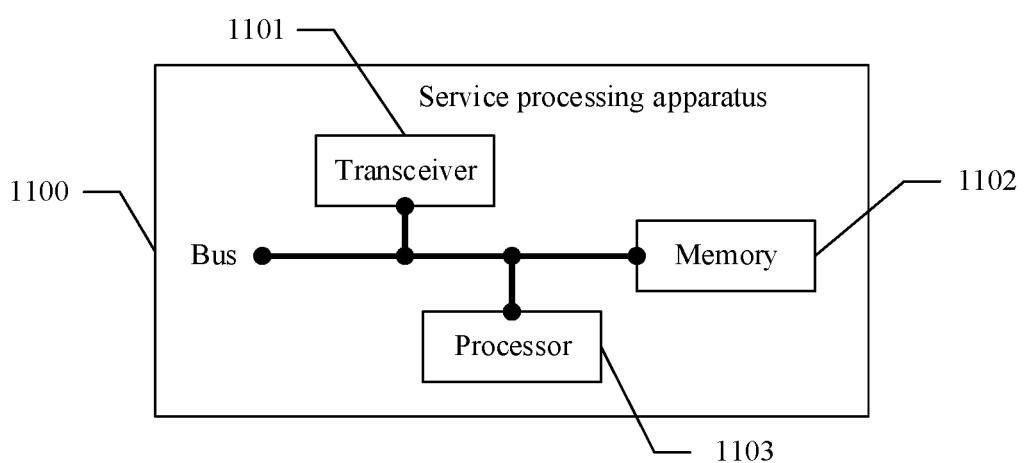
FIG. 11 is a schematic diagram of a service processing apparatus according to an embodiment of this application.

Referring to FIG. 11, according to one embodiment of this application, a service processing apparatus 1100 includes:

a transceiver 1101, a memory 1102, and a processor 1103.

The processor 1103 is configured to generate a CU handover request about a first service, where the CU handover request includes a first service identifier, and the first service identifier is used to identify the first service.

The transceiver 1101 is configured to: send the CU handover request to a target CU, so that the target CU sends a first bearer setup request about the first service to a first DU, and the first bearer setup request includes the first service identifier; and enable the first DU to determine, based on the first service identifier, whether a service resource needs to be allocated to the first service, and to send a first bearer setup response to the target CU, where the first bearer setup response includes information used to indicate whether the service resource needs to be allocated to the first service.

The memory 1102 is configured to store a program, the CU handover request, the first service identifier, the information used to indicate whether the service resource needs to be allocated to the first service, and a CU handover response.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application, in essence, or a part that contributes to the prior art, or all or a part of the technical solutions may be embodied in a form of a software product. The computer software product is stored in a storage medium, and includes several instructions for instructing a computer device (which may be a personal computer, a server, a network device, and the like) to perform all or a part of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions of this application, but are not intended to limit the technical solutions. Although this application is described in detail with reference to the foregoing embodiments, a person of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of this application.

What is claimed is:

1. A central unit handover method, comprising:
receiving, by a first distributed unit (DU), a first bearer setup request that is about a first service and that is sent by a target central unit (CU), wherein the first bearer setup request comprises a first service identifier;
determining, by the first DU based on the first service identifier, whether a service resource needs to be allocated to the first service; and
sending, by the first DU, a first bearer setup response to the target CU, wherein the first bearer setup response comprises information used to indicate whether the service resource needs to be allocated to the first service,
wherein the determining, by the first DU based on the first service identifier, whether the service resource needs to be allocated to the first service comprises:
if a service identifier set comprises the first service identifier, and a service indicated by any service identifier in the service identifier set is a service being executed by the first DU, determining, by the first DU, that no service resource needs to be allocated to the first service; or
if the service identifier set does not comprise the first service identifier, determining, by the first DU, that the service resource needs to be allocated to the first service.

2. The method according to claim 1, after determining, by the first DU, that the service resource needs to be allocated to the first service, further comprising:
allocating, by the first DU, a first service resource to the first service.

3. The method according to claim 1, before receiving, by the first distributed unit DU, the first bearer setup request that is about the first service and that is sent by the target central unit CU, further comprising:
receiving, by the first DU, a second bearer setup request that is about a second service and that is sent by a source CU;
generating, by the first DU, a second service identifier based on the second service, and using the second service identifier as one of the service identifier set; and
sending, by the first DU, a second bearer setup response to the source CU, wherein the second bearer setup response comprises the second service identifier.

4. The method according to claim 3, after receiving, by the first DU, the second bearer setup request that is about the second service and that is sent by the source CU, further comprising:
allocating, by the first DU, a second service resource to the second service.

5. The method according to claim 1, wherein the first service identifier is an identifier of the service resource of the first service.

6. The method according to claim 1, wherein the first service is a data domain service or a circuit domain service.

7. A service processing apparatus, comprising:
a processor; and
a non-transitory computer-readable storage medium coupled to the processor and storing programming instructions for execution by the processor, the programming instructions instruct the processor to:
receive a first bearer setup request that is about a first service and that is sent by a target central unit (CU), wherein the first bearer setup request comprises a first service identifier;

determine, based on the first service identifier, whether a service resource needs to be allocated to the first service; and send a first bearer setup response to the target CU, wherein the first bearer setup response comprises information used to indicate whether the service resource needs to be allocated to the first service, wherein the programming instructions instruct the processor to:

if a service identifier set comprises the first service identifier, and a service indicated by any service identifier in the service identifier set is a service being executed by a first DU, determine that no service resource needs to be allocated to the first service; or if the service identifier set does not comprise the first service identifier, determine that the service resource needs to be allocated to the first service.

8. The service processing apparatus according to claim 7, wherein the programming instructions instruct the processor to: allocate a first service resource to the first service.

9. The service processing apparatus according to claim 7, wherein the programming instructions instruct the processor to:

receive, a second bearer setup request that is about a second service and that is sent by a source CU;

generate a second service identifier based on the second service, and use the second service identifier as one of the service identifier set; and send, a second bearer setup response to the source CU, wherein the second bearer setup response comprises the second service identifier.

10. The service processing apparatus according to claim 9, wherein the programming instructions instruct the processor to:

allocate a second service resource to the second service.

11. The service processing apparatus according to claim 7, wherein the first service identifier is an identifier of the service resource of the first service.

12. The service processing apparatus according to claim 7, wherein the first service is a data domain service or a circuit domain service.

13. A computer-readable storage medium comprising computer program codes stored thereon, executable by one or more processors for performing handover, the computer program codes including wherein the instructions comprises:

instructions for receiving a first bearer setup request that is about a first service and that is sent by a target central unit (CU), wherein the first bearer setup request comprises a first service identifier;

instructions for determining based on the first service identifier, whether a service resource needs to be allocated to the first service; and instructions for sending a first bearer setup response to the target CU, wherein the first bearer setup response comprises information used to indicate whether the service resource needs to be allocated to the first service, wherein the instructions for determining based on the first service identifier, whether a service resource needs to be allocated to the first service comprises:

if a service identifier set comprises the first service identifier, and a service indicated by any service identifier in the service identifier set is a service being executed by the first DU, determining, by the first DU, that no service resource needs to be allocated to the first service; or if the service identifier set does not comprise the first service identifier, determining, by the first DU, that the service resource needs to be allocated to the first service.

14. The computer-readable storage medium according to claim 13, wherein the instructions further comprises:

instructions for allocating a first service resource to the first service.

15. The computer-readable storage medium according to claim 13, wherein the instructions further comprises:

instructions for receiving a second bearer setup request that is about a second service and that is sent by a source CU;

instructions for generating a second service identifier based on the second service, and using the second service identifier as one of the service identifier set; and instructions for sending a second bearer setup response to the source CU, wherein the second bearer setup response comprises the second service identifier.

16. The computer-readable storage medium according to claim 15, wherein the instructions further comprises:

instructions for allocating a second service resource to the second service.

17. The computer-readable storage medium according to claim 13, wherein the first service identifier is an identifier of the service resource of the first service.

* * * * *